United States Patent

Hartmann

(10) Patent No.: US 6,360,157 B1
(45) Date of Patent: Mar. 19, 2002

(54) METHOD AND DEVICE FOR REGULATING AT LEAST ONE TRAVEL DYNAMIC VARIABLE IN A MOTOR VEHICLE

(75) Inventor: Uwe Hartmann, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,470

(22) PCT Filed: Oct. 22, 1998

(86) PCT No.: PCT/DE98/03104

§ 371 Date: Nov. 23, 1999

§ 102(e) Date: Nov. 23, 1999

(87) PCT Pub. No.: WO99/48735

PCT Pub. Date: Sep. 30, 1999

(30) Foreign Application Priority Data

Mar. 25, 1998 (DE) .......................................... 198 13 019

(51) Int. Cl.⁷ ................................ B60T 8/64; B60T 7/10
(52) U.S. Cl. ........................... 701/70; 303/95; 303/105; 303/96; 303/111; 701/48; 180/197; 188/31; 188/158; 188/72.1
(58) Field of Search ..................... 701/70, 76; 303/110, 303/103, 100; 180/197

(56) References Cited

U.S. PATENT DOCUMENTS

| 4,629,043 A | * | 12/1986 | Matsuo et al. ............... 192/4 A |
| 4,925,253 A | * | 5/1990 | Swiden ....................... 303/110 |
| 5,255,194 A | * | 10/1993 | Schaufelberger et al. ..... 701/76 |
| 5,367,461 A | * | 11/1994 | Matsuda et al. ............... 701/76 |
| 6,026,343 A | * | 2/2000 | Ogino .......................... 701/72 |
| 6,139,117 A | * | 10/2000 | Shirai et al. ..................... 303/3 |

FOREIGN PATENT DOCUMENTS

| DE | 30 45 888 | 6/1982 |
| EP | 0 249 431 | 12/1987 |
| EP | 0 394 387 | 10/1990 |
| EP | 0 409 063 | 1/1991 |

OTHER PUBLICATIONS

Van A. Zanten et al., "FDR—Die Fahrdynamik–Regelung Von Bosch" ATZ Automobiltechnische Zeitschrift, vol. 96, No. 11, pp. 674–678, 683–689 (Nov. 1, 1994).*

* cited by examiner

*Primary Examiner*—William A. Cuchlinski, Jr.
*Assistant Examiner*—Tuan C To
(74) *Attorney, Agent, or Firm*—Kenyon & Kenyon

(57) ABSTRACT

A method and a device for controlling at least one operating-dynamics variable of a vehicle in closed loop are discussed. In particular, the at least one operating-dynamics variable includes a variable describing the yaw rate of the vehicle. The device includes arrangements which are used for determining whether an actuation of a parking brake contained in the vehicle exists above a predefined value for the vehicular speed. If such an actuation of the parking brake exists, then no braking interventions and/or no engine interventions, to be implemented along the lines of the closed-loop control of the at least one operating-dynamics variable, are carried out. The device makes it possible to execute an escape turn with a vehicle equipped with a device for the closed-loop control of an operating-dynamics variable.

21 Claims, 2 Drawing Sheets

METHOD AND DEVICE FOR REGULATING AT LEAST ONE TRAVEL DYNAMIC VARIABLE IN A MOTOR VEHICLE

FIELD OF THE INVENTION

The present invention relates to a method and a device for controlling at least one operating-dynamics variable of a closed loop.

A system for the closed-loop control of the operating dynamics of a vehicle is described in the "FDR—Fahrdynamikregelung von Bosch", Automobiltechnische Zeitschrift, Vol. 96, No. 11, Pages 674–689 (1994). In this system, a setpoint value for the float angle and the yaw rate, respectively, are determined in each case based at least on the steering-wheel angle and the vehicular speed. The setpoint values for the float angle and the yaw rate are supplied, together with the corresponding actual values, to a state controller which ascertains setpoint vehicular yawing moments from the corresponding system deviations. These setpoint vehicular yawing moments are converted into setpoint slippage changes at suitable wheels, taking into consideration the prevailing slippage values. The setpoint slippage changes are implemented by the secondary traction control system (ASR) or anti-lock braking system (ABS) wheel controllers. No provision is made in this system for carrying out an escape turn, during which one or two rear wheels are caused to lock by actuating the parking brake.

The European Patent 0 394 387 B1 (corresponding to the U.S. Pat. No. 5,255,194) describes an anti-lock control system which includes skid detection. If it is determined that the vehicle is skidding, then the front wheels are brought into high slippage by braking, especially to the point of locking. Alternatively, provision is made for shutting down the anti-lock braking system at least partially when skidding is detected.

The object of the present invention is to improve systems for the closed-loop control of the operating dynamics of a vehicle to the effect that it is also possible to execute an escape turn with vehicles equipped with such systems.

SUMMARY OF THE INVENTION

Systems for controlling the operating dynamics of a vehicle in closed loop, hereinafter called operating-dynamics control systems, as are described, for example, in the publication "FDR—die Fahrdynamikregelung von Bosch" mentioned above, seek to maintain a stable vehicle behavior under all conditions. This means that the longitudinal axis of the vehicle agrees approximately with the moving direction of the vehicle. The deviation between the longitudinal axis of the vehicle and the moving direction of the vehicle is characterized by the float angle. The float angle should not become greater than approximately 5 to 10°, since otherwise the driving condition is defined as "strongly oversteered", which can then quickly change into "skidding". An objective of operating-dynamics control systems is to prevent this skidding. To that end, using braking interventions at suitable wheels, a yawing moment is applied to the vehicle in such a way that the longitudinal axis of the vehicle is turned toward the moving direction of the vehicle.

However, there are also cases in which the above-described stabilization of the vehicle is unwanted. This is primarily true for "special protection vehicles" for persons who are at risk, and vehicles of security services. Here, the drivers must be able to turn the vehicle quickly by 180° during travel. Such a driving maneuver is described as an escape turn. During the escape turn, one or two rear wheels are caused to lock by actuating the parking brake, after a yaw movement was initiated by suitable steering movements. As a result of the locking rear wheels, the lateral force to stop the yawing is lacking at the rear axle, and the vehicle turns.

At this point, an operating-dynamics control system will sharply brake a front wheel in order to reduce the lateral force at the front axle as well. In such a case, the vehicle moves laterally, but does not turn sufficiently.

In order to permit a 180° turn triggered with the aid of the parking brake, even in the case of vehicles which are equipped with an operating-dynamics control system, this situation must be detected and the stabilizing braking interventions at the front axle or another stabilizing intervention by the operating-dynamics control system must be temporarily prevented.

To this end, the device of the present invention for controlling at least one operating-dynamics variable of a vehicle in closed loop advantageously includes arrangements that are used to ascertain whether an actuation of the vehicle parking brake, which acts particularly on the rear wheels, exists above a predefined value for the vehicular speed.

The device of the present invention also contains an arrangement by which trigger signals and/or trigger variables are ascertained at least as a function of the operating-dynamics variable. Arrangements for implementing braking interventions and/or engine interventions along the lines of a closed-loop control of the at least one operating-dynamics variable are triggered by these trigger signals and/or trigger variables. If an actuation of the parking brake exists above the predefined value for the vehicular speed, then advantageously no braking interventions and/or engine interventions, to be carried out along the lines of the closed-loop control of the at least one operating-dynamics variable, are performed.

Two procedures advantageously present themselves for this. If an actuation, according to the invention, of the parking brake exists, then either no trigger signals and/or trigger variables are ascertained, or predefined values, in particular the value zero, are output for the trigger signals and/or trigger variables.

It is particularly advantageous if, for the case when an actuation of the parking brake according to the invention exists, the braking interventions and/or the engine interventions, which are to be carried out along the lines of a closed-loop control of the at least one operating-dynamics variable, are made inoperative and/or are suppressed at least for the front wheels of the vehicle. Because of this, the device for controlling at least one operating-dynamics variable of the vehicle in closed loop is unable to reduce the lateral force at the front wheels, and thus the execution of an escape turn is first made possible.

To determine whether an actuation of the parking brake according to the invention exists, the device of the present invention first of all advantageously includes arrangements which are used to ascertain first wheel variables, and secondly includes arrangements which are used to ascertain second wheel variables. Since the intention is to make this ascertainment without additional sensors, such variables are advantageously used as first or second wheel variables which already exist in conjunction with the closed-loop control of the at least one operating-dynamics variable of the vehicle. To this end, wheel-speed variables which describe the speeds of the wheels are ascertained as first wheel variables. Pressure variables which describe the brake pressures prevailing in the wheel-brake cylinders of the wheels are ascertained as second wheel variables. The actuation of the parking brake is determined in particular as a function of the first and/or second wheel variables of the wheels upon which the parking brake acts.

The wheel-speed variables are ascertained at least as a function of wheel rotational-frequency variables detected with the aid of wheel rotational-frequency sensors. Two procedures present themselves for ascertaining the pressure variables. First of all, the pressure variables are advantageously ascertained using a mathematical model. In this case, the pressure variables are a function at least of an initial-pressure variable, which describes the initial pressure set by the driver and is detected preferably with the aid of a pressure sensor, and of the trigger signals and/or trigger variables for the arrangement for carrying out braking interventions. This procedure has the advantage that sensors can be used which already exist in the device for controlling at least one operating-dynamics variable of the vehicle in closed loop. The alternative is to detect the pressure variables with the aid of pressure sensors allocated to the wheels.

In order, as already mentioned above, to be able to dispense with a switch which indicates an actuation of the parking brake, the actuation of the parking brake according to the invention is advantageously ascertained as follows: An actuation of the parking brake exists when for at least one of the wheels upon which the parking brake acts, the corresponding first wheel variable is less than a first characteristic value, and when the corresponding second wheel variable is less than a second characteristic value. This procedure offers itself for the reason that an actuation of the parking brake becomes noticeable because the wheels upon which the parking brake acts are braked, i.e., exhibit a lower speed compared to the vehicular speed, although no brake pressure exists in the wheel-brake cylinders of these wheels.

The following further procedure is an alternative for determining whether an actuation of the parking brake exists: An actuation of the parking brake exists when for at least one of the wheels upon which the parking brake acts, the change of the corresponding first wheel variable over time is greater than a third characteristic value, and when the corresponding second wheel variable is less than the second characteristic value.

To summarize, it can be maintained that an actuation of the parking brake exists when, based on the wheel-speed variables and the pressure variables, it is determined that the corresponding speeds of the wheels upon which the parking brake acts are reducing, although these wheels are nearly brakeless.

Alternatively to the procedure indicated at the outset, in which no braking interventions and/or engine interventions are carried out in response to the existence of an actuation of the parking brake, offering itself advantageously is that the trigger signals and/or trigger variables underlying the braking interventions and/or engine interventions are ascertained as a function of a variable which characterizes the actuation of the parking brake.

Further advantages and advantageous refinements can be gathered from the subclaims, the drawing, and the description of the exemplary embodiment.

BRIEF DESCRIPTION OF THE DRAWINGS

The drawing is composed of FIGS. 1 through 3.

It should be pointed out that blocks having the same designation in different Figures have the same function.

DETAILED DESCRIPTION OF THE INVENTION

Figure 1:
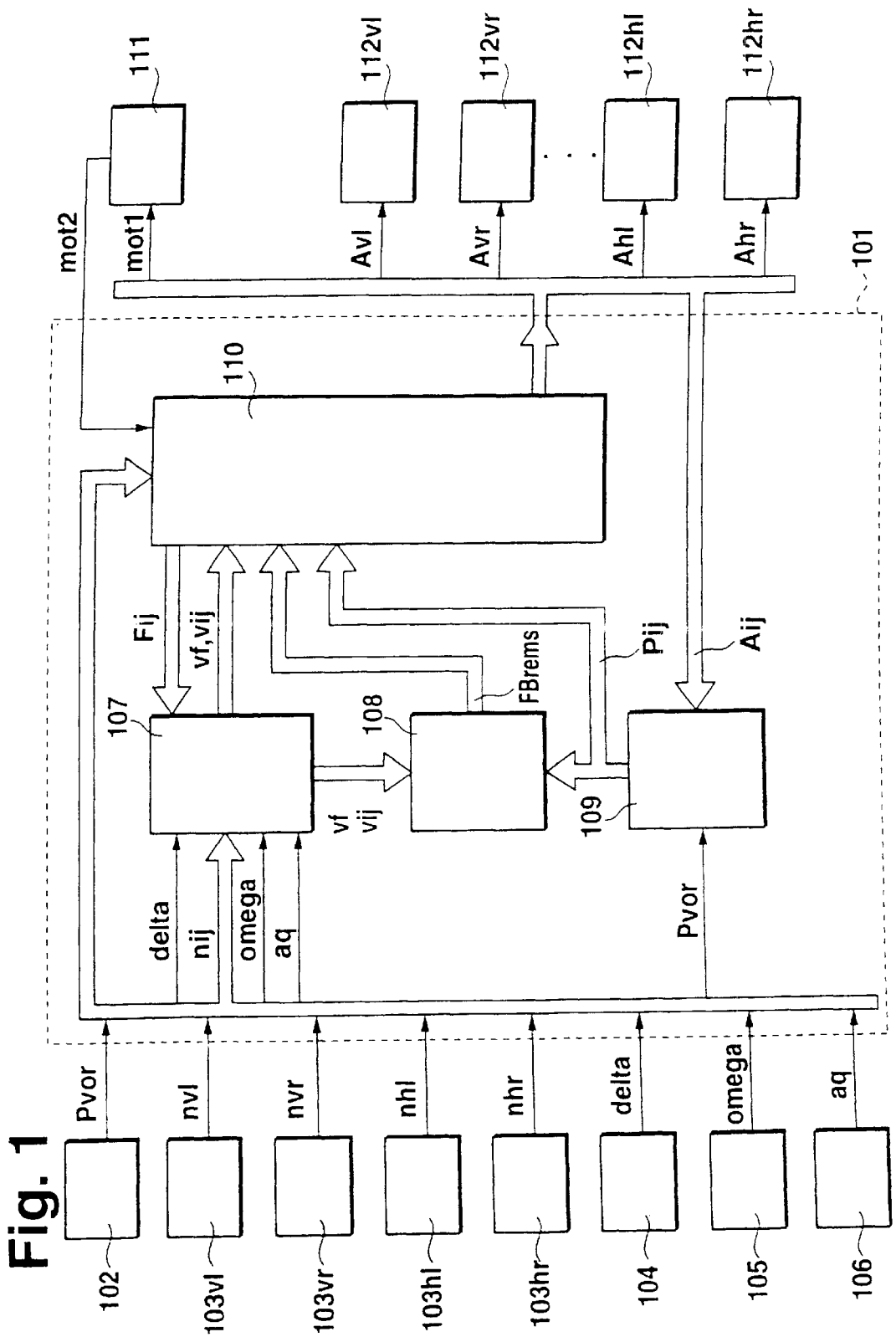
FIG. 1 shows a general arrangement of the device of the present invention for implementing the method of the present invention. With the aid of a flow chart.

FIG. 1 shall be discussed first.

Block 101 represents the device of the present invention for the closed-loop control of at least one operating-dynamics variable of a vehicle (not shown). Block 101 is usually a control unit.

Blocks 102, 103$ij$, 104, 105 and 106, respectively, represent arrangements used to detect the specific vehicle variables for a device to control at least one operating-dynamics variable in closed loop, as it is described in the above-indicated publication "FDR—die Fahrdynamikregelung von Bosch". Block 102 represents a pressure sensor used to detect an initial-pressure variable Pvor which describes the initial pressure set by the driver. Blocks 103$vl$, 103$vr$, 103$hl$ and 103$hr$ represent wheel rotational-frequency sensors used to detect corresponding wheel rotational-frequency variables nvl, nvr, nhl and nhr for the wheels. Hereinafter, the simplified spelling 103$ij$ will be introduced for the wheel rotational-frequency sensors. In this context, index i indicates whether the wheel rotational-frequency sensor is located at the rear axle (h) or at the front axle (v). Index j indicates the allocation to the right (r) or to the left (l) side of the vehicle. This designation by the two indices i and j, respectively, is corresponding for all variables or components for which it is used.

Block 104 represents a steering-angle sensor used to detect the steering angle delta adjusted by the driver. Block 105 represents a yaw-rate sensor used to detect the yaw rate omega of the vehicle, i.e., the rotative speed of the vehicle about its vertical axis. Block 106 represents a transverse-acceleration sensor used to detect the transverse acceleration aq acting upon the vehicle. The variable omega represents the operating-dynamics variable of the vehicle which is controlled by the device of the present invention.

The sensor suite described above is characteristic for the "operating-dynamics control systems" as are described in the aforesaid publication "FDR—die Fahrdynamikregelung von Bosch".

Variables Pvor, nij, delta, omega and aq detected by the sensors are supplied to a block 110 which represents the controller implemented in control unit 101, and which is yet to be described.

Variables delta, nij, omega and aq are supplied to a block 107. In addition to these input variables, starting from block 110, variables Fij which describe the tire contact forces or tire braking forces of the corresponding wheels are supplied to block 107. Based on the variables supplied to it, a variable vf describing the vehicular speed, as well as first wheel variables vij which represent wheel-speed variables and which describe the speeds of the wheels, are ascertained in block 107. Starting from block 107, variables vf and vij are supplied to a block 108 and to block 110.

According to the above-specified publication "FDR—die Fahrdynamikregelung von Bosch", wheel-speed variables vij are ascertained as follows: First of all, based on wheel rotational-frequency variables nij and tire braking forces or tire contact forces Fij, "free-rolling", i.e., slip-free wheel speeds are ascertained for the corresponding wheels. Based on these free-rolling wheel speeds, wheel-speed variables vij are ascertained, taking into consideration the vehicle movement which is described by variables delta, omega and aq, respectively. Vehicular speed vf is ascertained in known manner on the basis of wheel-speed variables vij.

Second wheel variables Pij are ascertained in block 109. These second wheel variables are pressure variables which describe the braking pressures prevailing in the wheel-brake cylinders of the wheels. For example, as described in the aforesaid publication "FDR—die Fahrdynamikregelung von Bosch", pressure variables Pij are ascertained as a function of initial pressure Pvor and as a function of trigger signals and/or trigger variables Aij for arrangement 112ij used to carry out braking interventions. These trigger signals and/or trigger variables Aij represent, for example, the trigger times of the valves allocated to the corresponding wheel-brake cylinders. In this case, pressure variables Pij are ascertained using a mathematical model. Starting from block 109, pressure variables Pij are supplied to block 108 and block 110.

An alternative to the above-described ascertainment of pressure variables Pij is to detect these pressure variables with the aid of pressure sensors allocated to the corresponding wheels.

In block 108, the ascertainment of the present invention is carried out, by which it is determined whether the parking brake contained in the vehicle is actuated above a predefined value for the vehicular speed. This ascertainment according to the invention will be discussed in detail in conjunction with FIG. 2. Based on the ascertainment taking place in block 108, it is communicated to block 110, with the aid of variable Fbrems, whether an actuation of the parking brake exists or not.

110 indicates the controller, i.e., the vehicle controller, implemented in control unit 101. At the same time, this also includes a trigger logic for engine 111 and actuators 112ij. Controller 110 is a controller which, in its basic function, controls a variable describing the operating dynamics, such as a variable describing the yaw rate of the vehicle, by braking interventions and/or by engine interventions. At this point, reference is made to the publication "FDR—die Fahrdynamikregelung von Bosch" mentioned above. Alternatively, controller 110 can also be, for example, a brake-slip controller and/or an anti-spin controller.

The closed-loop control taking place in its basic function in block 110 is based in known manner on variables Pvor, nij, delta, omega, and aq supplied to it, as well as a variable mot2 which, for example, describes the engine speed of engine 111, and which is supplied to block 110 starting from engine 111.

In addition to the closed-loop control implemented in the basic function in block 110, an actuation, according to the invention, of the parking brake is taken into account, by which an "escape turn" is intended to be carried out by the driver.

Controller 110 generates trigger signals and/or trigger variables mot1 and Aij, respectively, by which engine 111 and actuators 112ij allocated to the vehicle are controlled. Reference is made to the aforesaid publication "FDR—die Fahrdynamikregelung von Bosch" with respect to the generating of variables mot1 and Aij, respectively, according to the closed-loop control implemented for the basic function. If an actuation of the parking brake exists according to the invention, which is communicated to controller 110 by variable Fbrems, then variables mot1 and Aij, respectively, to be output by controller 110 are modified accordingly. Variables mot1 and Aij are modified in such a way that no braking interventions and/or engine interventions, to be carried out along the lines of the closed-loop control of the at least one operating-dynamics variable, are implemented by engine 111 or actuators 112ij. For this purpose, for example, no trigger signals and/or trigger variables mot1 and Aij, respectively, are ascertained, or they are assigned predefined values, in particular the value zero.

The trigger signals and/or trigger variables mot1 and Aij, respectively, are primarily generated in such a way that the braking interventions and/or the engine interventions, which are to be carried out along the lines of a closed-loop control of the at least one operating-dynamics variable, are made inoperative and/or are suppressed at least for the front wheels of the vehicle.

Actuators 112ij are of the type, for example, by which a braking force can be generated at the corresponding wheels. For example, with the aid of trigger variable mot1, the throttle-valve position of the engine is influenced. With the aid of trigger variables Aij, actuators 112ij are influenced in such a way that different braking forces are generated at the corresponding wheels.

Actuators 112ij, which correspond in particular to valves allocated to the wheel-brake cylinders, by which braking medium is applied to the corresponding wheel-brake cylinder, can be part of a hydraulic, an electrohydraulic, a pneumatic, an electropneumatic or a purely electrical braking system.

In the following, the method of the present invention being carried out in the device of the present invention shall be described with the aid of FIG. 2.

The method according to the invention begins with a step 201, in which variables vij, vf and Pij are made available. As described in connection with FIG. 1, wheel-speed variables vij, which represent the first wheel variables, and vehicular speed vf are ascertained in block 107. Pressure variables Pij, which describe the second wheel variables, are ascertained in block 109. Subsequent to step 201, a step 202 is carried out.

In step 202, it is ascertained whether vehicular speed vf is greater than a characteristic value vs1 for the vehicular speed. The speed query carried out in step 202 is necessary, because an escape turn can only be executed when the vehicle has a certain speed. In other words, only in the case in which the vehicular speed is greater than a predefined value is it necessary to monitor the parking brake with a view to an escape turn which may be carried out. Therefore, in the event that it was determined in step 202 that the vehicular speed is greater than characteristic value vs1, a step 203 is carried out subsequent to step 202. On the other hand, if the query taking place in step 202 is not satisfied, then step 201 is executed once more subsequent to step 202.

The actual determination as to whether an actuation of the parking brake exists takes place in step 203. This determination is made as a function of first and second wheel variables, wheel-speed variables vij and pressure variables Pij being used as first and second wheel variables, respectively. The determination whether an actuation of the wheel brake exists is carried out based on the wheel variables of the wheels upon which the parking brake acts, i.e., based on the corresponding wheel variables of the rear wheels.

If a braking force is applied to the rear wheels by the is parking brake during travel, then in the extreme case, the rear wheels come to a standstill, i.e., they lock up, although no braking pressure is supplied in the corresponding wheel-brake cylinders. This fact is utilized for detecting the actuation of the parking brake.

The query carried out in step 203 is composed of two partial queries, one partial query for each rear wheel. An actuation of the parking brake exists when at least one of the two partial queries is fulfilled, i.e., when for at least one of the wheels upon which the parking brake acts, the corresponding first wheel variable is smaller than a first characteristic value, in particular smaller than a first threshold value, and when the corresponding second wheel variable is smaller than a second characteristic value, in particular smaller than a second threshold value.

In the present case, the query carried out in step 203 is composed of a first partial query for the left rear wheel and a second partial query for the right rear wheel. In the first partial query, it is checked whether wheel speed vhl of the left rear wheel is less than first characteristic value vs2, and whether at the same time, pressure variable Phl of the left rear wheel is less than second characteristic value Ps. In the second partial query, it is checked whether wheel speed vhr of the right rear wheel is less than first characteristic value vs2, and whether at the same time, pressure variable Phr of the right rear wheel is less than second characteristic value Ps. The query carried out in step 203 is satisfied when at least one of the two partial queries is satisfied.

If it is established in step 203 that the query carried out in this step is satisfied, then a step 204 is executed following step 203. If, on the other hand, it is ascertained in step 203 that the query implemented in this step is not satisfied, then step 201 is carried out once again following step 203.

At this point, it should be noted that the following alternative is also conceivable for the ascertainment of the actuation of the parking brake described above: Instead of the comparison of the wheel speed of the corresponding rear wheel to the first characteristic value, the change of the corresponding wheel speed over time can also be compared to a third characteristic value, the above-described comparison of the corresponding wheel pressure to the second characteristic value being retained. It should also be noted that steps 202 and 203, respectively, are carried out in block 108.

Figure 2:
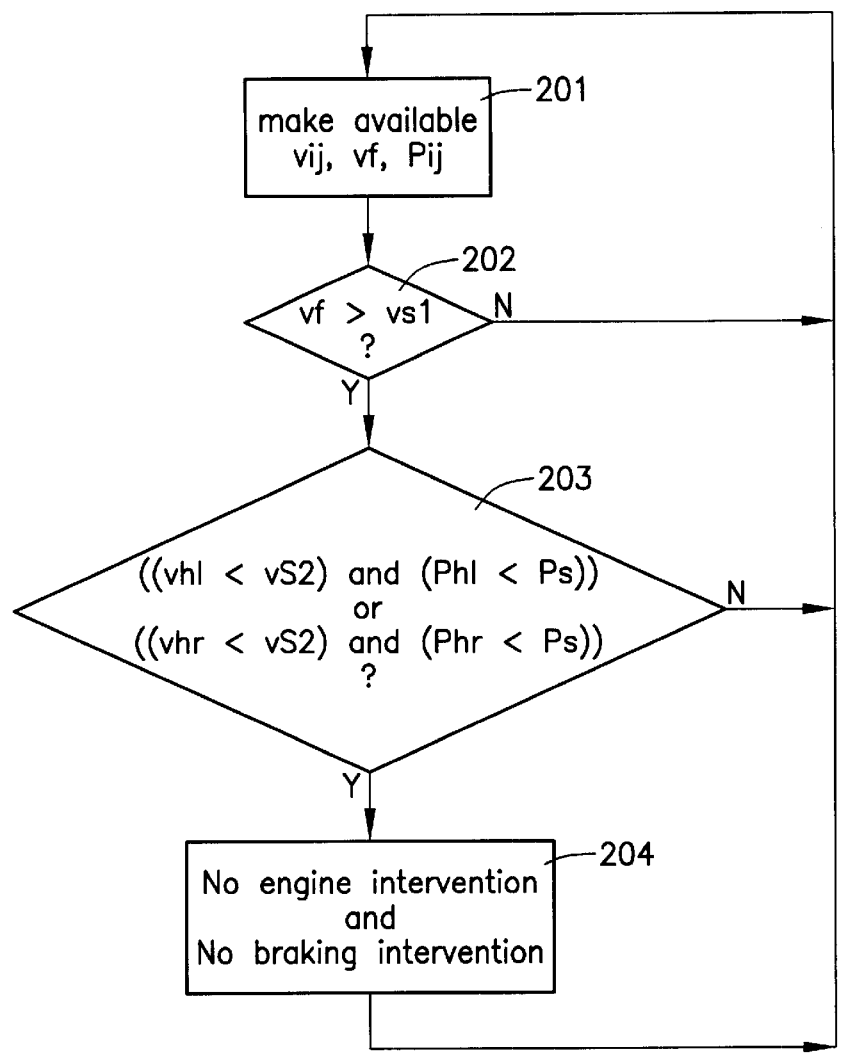
FIG. 2 shows a specific embodiment for implementing the method of the present invention. In a block diagram.

Variable Fbrems included in FIG. 1 is not shown in FIG. 2, since it is not necessary for the representation in FIG. 2. For the sake of completeness, however, it should be mentioned that variable Fbrems is generated when the query carried out in step 203 is satisfied.

If it is determined with the query performed in step 203 that an actuation of the parking brake exists above a predefined value for the vehicular speed, then step 204 is subsequently carried out, due to which, given the presence of such an actuation, no braking interventions and/or engine interventions, to be carried out along the lines of the closed-loop control of the at least one operating-dynamics variable, are executed. In this connection, reference is made to the explanations within the framework of FIG. 1.

Following step 204, step 201 is carried out once again.

Figure 3:
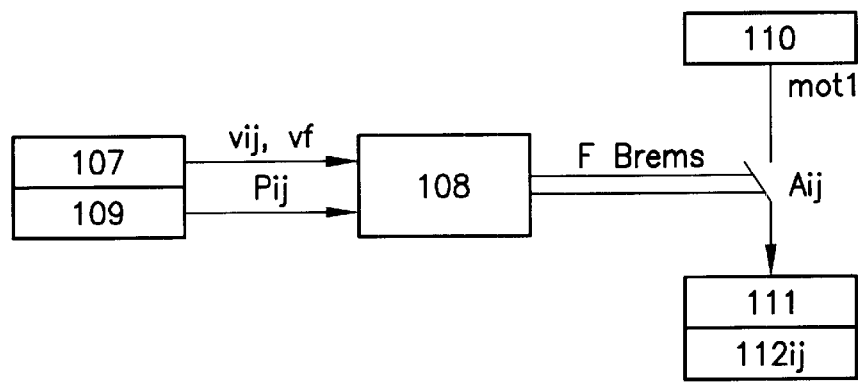
FIG. 3 shows the basic mode of operation of the device of the present invention.

The basic idea of the device and of the method of the present invention shall be elucidated with the aid of the block diagram shown in FIG. 3.

As described in connection with FIG. 1, wheel-speed variables vij and vehicular speed vf are ascertained with the assistance of block 107. These variables are supplied to block 108. As likewise described in connection with FIG. 1, pressure variables Pij are ascertained with the aid of block 109 and are supplied to block 108. In block 108, it is determined whether an actuation of the parking brake exists above a predefined value for the vehicular speed. Block 108 generates a signal Fbrems as a function of this ascertainment.

The trigger variables and/or trigger signals mot1 and Aij, respectively, for actuating engine 111 and actuators 112ij are determined with the aid of controller 110. As indicated in FIG. 3 by the symbolic switch, as a function of the variable or of the signal Fbrems, it is established whether engine 111 and actuators 112ij are acted upon with the aid of trigger signals and/or trigger variables mot1 and Aij, respectively, ascertained by controller 110. If it is determined in block 108 that no actuation of the parking brake according to the invention exists, then the switch is closed and the trigger signals and/or trigger variables act upon engine 111 and actuators 112ij accordingly. On the other hand, if it is determined in block 108 that an actuation of the parking brake according to the invention exists, then the switch is opened and engine 111 and actuators 112ij are not acted upon.

Finally, it should be noted that the form of the exemplary embodiment chosen in the description and the representation chosen in the Figures are not intended to represent any limiting effect on the idea essential to the invention.

What is claimed is:

1. A device for controlling at least one operating-dynamics variable of a vehicle, comprising:
    a first arrangement for implementing at least one of a braking intervention and an engine intervention in accordance with a control of the at least one operating-dynamics variable;
    a second arrangement for determining, when a speed of the vehicle is greater than a predefined value, whether an actuation of a parking brake of the vehicle exists,
    wherein, if the second arrangement determines the actuation of the parking brake, the implementation of the at least one of the braking intervention and the engine intervention by the first arrangement is avoided.

2. The device according to claim 1, wherein the at least one operating-dynamics variable includes a yaw rate of the vehicle.

3. The device according to claim 1, wherein the parking brake acts on rear wheels of the vehicle.

4. The device according to claim 1, further comprising:
    at least one of a third arrangement for ascertaining wheel-speed variables, the wheel-speed variables describing speeds of wheels of the vehicle and a fourth arrangement for ascertaining pressure variables, the pressure variables describing brake pressures prevailing in wheel-brake cylinders of the wheels of the vehicle,
    wherein the actuation of the parking brake is determined in accordance with at least one of the wheel-speed variables and the pressure variables of wheels upon which the parking brake acts.

5. The device according to claim 4, further comprising:
    wheel rotational-frequency sensors, and
    a pressure sensor,
    wherein the first arrangement has a drive signal as input,
    wherein the third arrangement ascertains the wheel-speed variables at least as a function of wheel rotational-frequency variables,
    wherein the wheel rotational-frequency variables are detected by the wheel rotational-frequency sensors,
    wherein the fourth arrangement ascertains the pressure variables at least as a function of an initial-pressure variable and the drive signal, the initial-pressure variable describing an initially set pressure, the initial set pressure being ascertained by the pressure sensor.

6. The device according to claim 5, wherein the fourth arrangement ascertains the pressure variables using a mathematical model.

7. The device according to claim 4, wherein the actuation of the parking brake is determined to exist according to one of the following conditions:

when for at least one wheel upon which the parking brake acts, the first wheel variable corresponding to the at least one wheel is smaller than a first characteristic value and the second wheel variable corresponding to the at least one wheel is smaller than a second characteristic value, and when for at least one wheel upon which the parking brake acts, a change over time of the first wheel variable corresponding to the at least one wheel is greater than a third characteristic value and the second wheel variable corresponding to the at least one wheel is smaller than a second characteristic value.

8. The device according to claim 7, wherein the first characteristic value is a first threshold value.

9. The device according to claim 7, wherein the second characteristic value is a second threshold value.

10. The device according to claim 7, wherein the third characteristic value is a third threshold value.

11. The device according to claim 1, further comprising:

a fifth arrangement for ascertaining, at least as a function of the operating-dynamics variable, a drive signal, wherein the drive signal drives the first arrangement for implementing at least one of the braking intervention and the engine intervention in accordance with the control of the operating-dynamics variable, wherein, if the second arrangement determines the actuation of the parking brake the fifth arrangement is affected by one of the following conditions: the determination of the drive signal by the fifth arrangement is suppressed, and the fifth arrangement sets the drive signal to a predefined value.

12. The device according to claim 11, wherein the predefined value is a zero value.

13. The device according to claim 4, wherein the actuation of the parking brake is determined to exist when, based on the wheel-speed variables and the pressure variables, corresponding speeds of the wheels upon which the parking brake acts are determined to be reducing, although the wheels are nearly brakeless.

14. The device according to claim 1, wherein if the actuation of the parking brake is determined to exist, then the at least one of the braking intervention and the engine intervention to be carried out in accordance with the control of the at least one operating-dynamics variable is suppressed at least for front wheels of the vehicle.

15. A method for controlling at least one operating-dynamics variable of a vehicle, comprising the steps of:

determining whether an actuation of a parking brake of the vehicle exists when a speed of the vehicle is greater than a predefined value; and avoiding an implementation of at least one of a braking intervention and an engine intervention in accordance with a control of the at least one operating-dynamics variable if the actuation of the parking brake is determined to exist.

16. The method according to claim 15, wherein the at least one operating-dynamics variable includes a variable describing a yaw rate of the vehicle.

17. The method according to claim 15, wherein the parking brake acts on rear wheels of the vehicle.

18. A device for controlling at least one operating-dynamics variable of a vehicle, comprising:

an arrangement for ascertaining at least one of trigger signals and trigger variables at least as a function of the at least one operating-dynamics variable, the at least one of the trigger signals and the trigger variables being used to trigger an arrangement for implementing at least one of a braking intervention and an engine intervention according to a control of the at least one operating-dynamics variable;

an arrangement for ascertaining a speed variable, the speed variable describing a speed of the vehicle; and an arrangement for determining, as a function of at least a comparison of the speed variable with a first characteristic value, whether an actuation of a parking brake of the vehicle exists, wherein the at least one of the trigger signals and the trigger variables is ascertained as a function of the determination of whether the actuation of the parking brake exists.

19. The device according to claim 18, wherein the at least one operating-dynamics variable includes a variable describing a yaw rate of the vehicle.

20. The device according to claim 18, wherein the parking brake acts on rear wheels of the vehicle.

21. The device according to claim 18, wherein the first characteristic value is a first threshold value.

* * * * *